Figure 1:
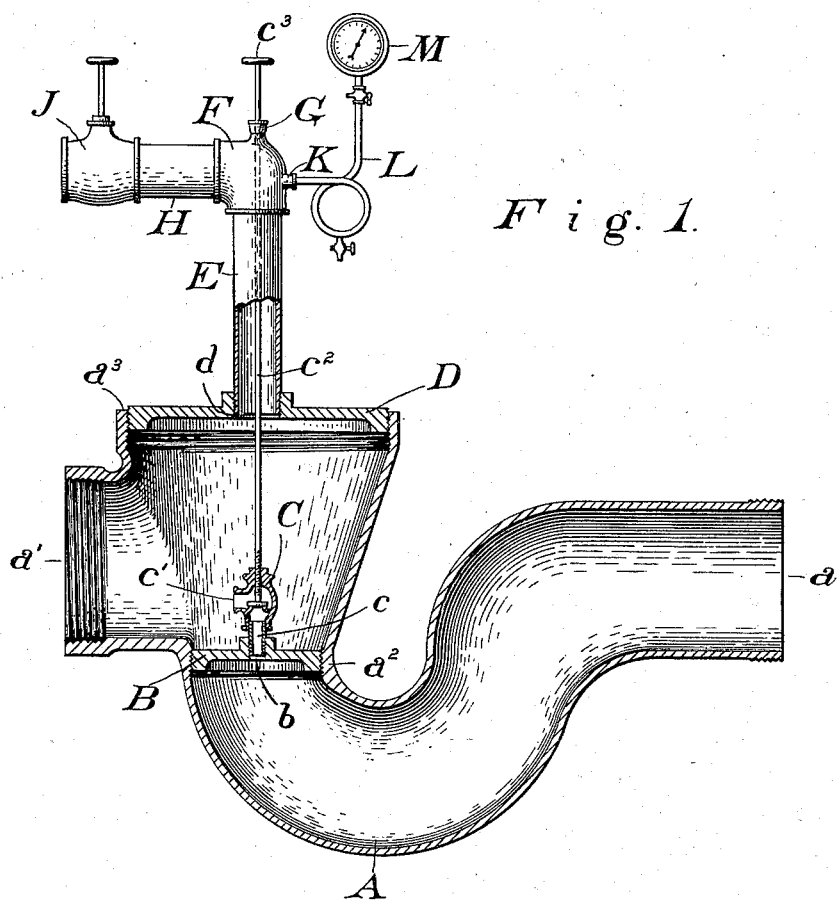

(No Model.)

D. BUIST & E. BREAKELL.
TESTING TRAP.

No. 605,387. Patented June 7, 1898.

Witnesses
James S. Smith
William B. Thomas

Inventors
David Buist
Edward Breakell
By Edwin Guthrie
Attorney

UNITED STATES PATENT OFFICE.

DAVID BUIST, OF BERNARDSVILLE, NEW JERSEY, AND EDWARD BREAKELL, OF NEW YORK, N. Y.

TESTING-TRAP.

SPECIFICATION forming part of Letters Patent No. 605,387, dated June 7, 1898.

Application filed January 31, 1898. Serial No. 668,568. (No model.)

*To all whom it may concern:*

Be it known that we, DAVID BUIST, residing at Bernardsville, in the county of Somerset and State of New Jersey, and EDWARD BREAKELL, residing at New York, in the county of New York and State of New York, citizens of the United States, have invented certain new and useful Improvements in Testing-Traps; and we do declare the following to be a full, clear, and exact description of the invention, such as will enable others skilled in the art to which it appertains to make and use the same, reference being had to the accompanying drawing, and to the letters of reference marked thereon, which forms a part of this specification.

Our invention relates to testing-traps by means of which the plumbing systems of dwellings or other structures may be subjected to hydraulic pressure for the purpose of determining the presence or absence and location of leaks.

A further object of our invention is to afford a convenient pump connection for clearing the sewer-pipe leading from a house to street-main of obstructing matter.

Under the municipal ordinances of the greater number of cities and towns in this country a sufficient test of the plumbing of any given structure for leakage consists in filling all soil, waste, and vent piping to the highest level. It is necessary to provide some safe, sure, convenient, and at the same time readily attached and removed devices for closing the main drain or sewer at the outside wall of the building, thus cutting off the entire plumbing system for the purpose of determining that it is water-tight throughout, and if not at what points attention should be given to it. At the present time those testing-traps with which we are familiar have two hand-holes, one outside of the seal of the trap.

Our invention consists of a trap-bend of common form, having a threaded opening constructed to be coupled to the plumbing system, and an interior threaded portion adapted to engage a water-retaining plug, the plug having a threaded orifice, whereby it is connected with a valve, by way of which the contents of the plumbing system may be emptied into the sewer-trap and street-main. The stem of the emptying-valve is led upward through a pipe which is coupled to a suitable orifice in the single hand-hole or screw-plug which stops the only opening of the trap above the plumbing connection. The pipe through which the valve-stem passes is ordinarily provided with an elbow possessing a stuffing-box, through which the valve-stem passes to the outside and receives its hand-wheel or key end. From the elbow the pipe may be continued in connection with the water-supply system of the premises and street, or when greater pressure is called for with a pump. The water-supply piping is usually tapped for connection with a pressure-gage.

Each constituent element of our invention is described in detail and its individual office, together with the mode of operation of the whole, fully explained hereinbelow.

The drawing represents a side view of our invention, the trap portion being shown in vertical section.

Like letters designate like parts throughout.

Letter A marks the trap proper; $a$, the end toward the street-main; $a'$, the end threaded for coupling with the plumbing system; $a^2$, the thickened and interiorly-threaded portion forming the locus of the water-retaining plug, and $a^3$ the topmost opening or hand-hole of the trap, interiorly threaded to receive the hand-hole plate or screw-plug.

Letter B designates the water-retaining plug. It is customarily a circular cupped casting threaded in correspondence with portion $a^2$ of trap A and pierced centrally by a threaded orifice $b$.

Letter C marks the emptying-valve, one projecting outlet $c$ being threaded and coupled with orifice $b$ of the water-retaining plug and a second and only remaining mouth $c'$ opening into the trap area above plug B. It will be understood that by means of valve C the areas above and below the water-retaining plug may be joined or cut off one from the other. The valve-stem is marked $c^2$ and is provided at the extremity with a hand-wheel $c^3$ or equivalent attachment for turning it.

Letter D marks the hand-hole plug, a piece usually very similar to the water-retaining plug. It is screwed into the opening $a^3$ of the trap in the ordinary way. Plug D possesses a central threaded orifice $d$.

Letter E designates a pipe having one end screwed into orifice $d$ of the hand-hole plug and the remaining end coupled with an elbow F in the common manner and form. The elbow is provided with any suitable stuffing-box G, and through the pipe and stuffing-box the valve-stem $c^2$ passes to the exterior. From the elbow a second pipe H projects and is joined to a cut-off valve J. It is intended that valve J shall be connected with the general water-supply pressure in any convenient way.

Letter K marks a tapped nipple or projection forming a part of elbow F, and from the nipple a pipe L leads to a pressure-gage M.

To explain the operation, let it be assumed that the parts have been securely coupled, as plainly shown in the drawing, and that cut-off valve J has been connected with the water-supply. It will be readily understood that by closing valve C the street is entirely cut off, and any system of plumbing coupled at opening $a'$ of the trap may be filled to as high a level as desired by way of the water-supply piping E and H. It is also clear that upon opening emptying-valve C the plumbing system is wholly drained.

An additional advantage of our invention is that it may be employed to clear the sewer to the street-main by unscrewing and removing hand-hole D and valve C and substituting the outlet-pipe of any form of pressure-pump connected to orifice $b$. The pressure below water-retaining plug B exerted toward the street may be indefinitely increased.

Having thus described our invention, what we claim, and desire to protect by Letters Patent of the United States, is—

1. In a testing-trap, the combination of a trap bend or casing having ends constructed for connection with a plumbing system and sewer-pipe, said trap having a hand-hole, a hand-hole plug, a water-retaining plug having a threaded orifice, a valve connected with said orifice, said trap having an interior portion fashioned to engage said water-retaining plug, water-supply piping opening into said trap above said water-retaining plug, a stuffing-box opening into said trap above said water-retaining plug, and a valve-stem passing through said stuffing-box whereby the valve borne by said water-retaining plug may be operated, substantially as described.

2. In a testing-trap, the combination of a trap-bend having ends constructed for connection with a plumbing system and sewer-pipe, said trap having a hand-hole $a^3$, a threaded hand-hole plug D having a threaded orifice $d$, water-supply piping connected with orifice $d$, an elbow included in said water-supply piping, a stuffing-box attached to said elbow, a water-retaining plug having a threaded orifice, a valve connected with said orifice, said trap having an interior portion fashioned to engage said water-retaining plug, and a valve-stem passing through said stuffing-box whereby the valve borne by said water-retaining plug may be operated, substantially as described.

In testimony whereof we affix our signatures in presence of two witnesses.

DAVID BUIST.
EDWARD BREAKELL.

Witnesses:
ROBERT LYON,
D. F. STURGIS.